United States Patent

[11] 3,601,280

| [72] | Inventor | James R. Mills<br>51 Glencairn Ave., Toronto 12, Ontario, Canada |
|------|----------|---|
| [21] | Appl. No. | 802,953 |
| [22] | Filed | Feb. 27, 1969 |
| [45] | Patented | Aug. 24, 1971 |

[54] DISPOSABLE ALUMINUM LINER FOR BARBECUE
1 Claim, 3 Drawing Figs.

[52] U.S. Cl. .................................................. 220/63 R, 99/444
[51] Int. Cl. ....................................................... B65d 25/14
[50] Field of Search........................................... 99/444, 225; 126/9, 29, 25; 220/63; 229/3.5 MF, 2.5

[56] References Cited
UNITED STATES PATENTS

| 2,673,003 | 3/1954 | Stewart | 99/444 |
| 2,880,860 | 4/1959 | Gardiner, Jr. et al. | 229/3.5 MF |
| 2,918,051 | 12/1959 | Broman | 126/25 |
| 3,004,685 | 10/1961 | Hennies, Jr. | 229/3.5 MF |
| 3,113,505 | 12/1963 | Keppler | 99/444 |
| 3,236,403 | 2/1966 | Steinberg | 99/444 X |
| 3,424,145 | 1/1969 | Stitt | 126/25 |
| 3,448,735 | 6/1969 | Palmer | 126/25 |
| 2,100,192 | 11/1937 | Leindorf | 220/65 X |

Primary Examiner—Raphael H. Schwartz
Attorney—George H. Riches

ABSTRACT: A flexible fire-resistant disposable liner for a portable barbecue, the liner being made of aluminum foil which is ribbed and shaped to fit snugly into the barbecue, the spaces between the ribs form passages below the fuel.

PATENTED AUG24 1971 3,601,280

Inventor
James R. Mills
By
Attorney

DISPOSABLE ALUMINUM LINER FOR BARBECUE

BACKGROUND OF THE INVENTION

Barbecuing meat in the home garden, on the patio or while on a picnic is a popular outdoor pursuit which gives many people a great deal of pleasure.

The quality of barbecued meat may suffer due to the burning of residues remaining in the bottom of the barbecue from previous use. These residues include rancid grease and fat, which, when heated, will be evaporated by the fire and then may taint the food being prepared. The result is that the barbecued food is given an objectionable flavor.

The removal of ashes, soot and the melted rancid grease to avoid the foregoing disadvantages, is a messy job which most people like to avoid and as a result, the final clean up of the barbecue is left undone.

A further disadvantage of the present method of burning fuel in the barbecue is that as the fuel burns it tends to obstruct the circulation of air under the fuel bed.

OUTLINE OF THE INVENTION

The present invention overcomes the foregoing disadvantages. One advantage of the invention is that at the end of the barbecuing, the liner may be folded around the ashes, remaining fuel, and unburned drippings from the food to quickly prepare the barbecue for the next use.

A further advantage of the invention is the provision of the ribbed formation which improves air circulation permitting more even combustion of the briquettes and the use of a smaller quantity of fuel for a given heat output since improved air circulation ensures complete fuel combustion. More complete combustion results in less smoke and more efficient use of fuel.

Good air circulation is obtained in the present invention by forming the liner with ribs (or corrugations) on which the fuel is supported, the spaces between the ribs forming channels for the passage of air.

The invention and its use, is set forth in the following description and illustrated in the accompanying drawings in which.

Figure 1:
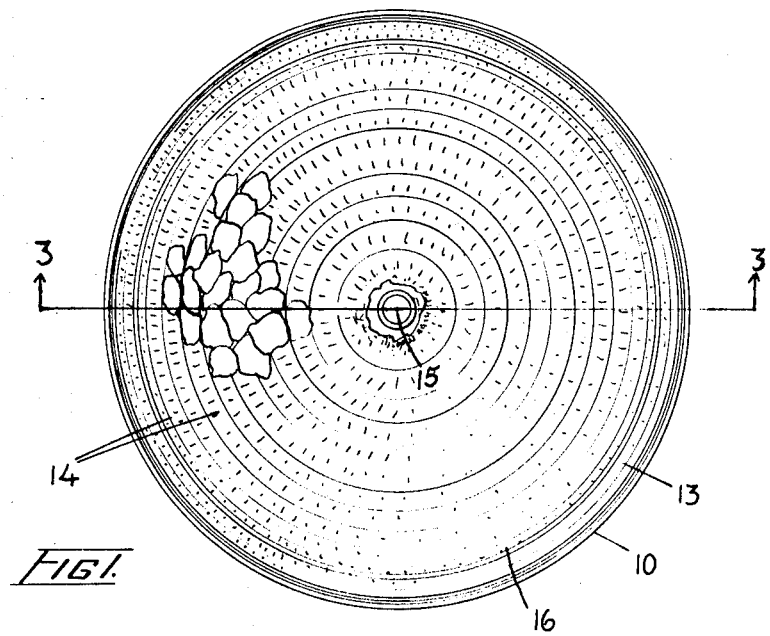
FIG. 1 shows a plan view of a circular liner which is ribbed annularly and has a central hole to receive a grill-supporting center post.
Figure 3:
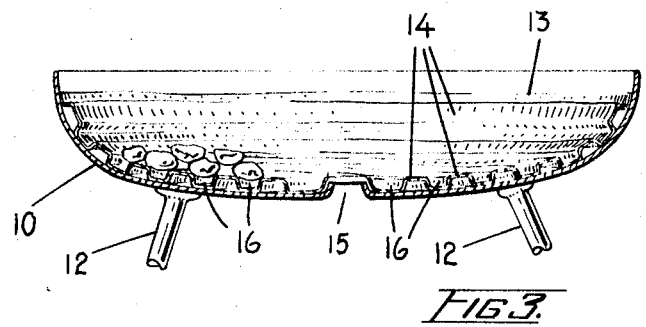
FIG. 3 is a cross section on the line 3–3 of FIG. 1 which shows the ribbing and the briquettes supported by it.

FIGS. 1 and 3 illustrate one embodiment of the invention and show it in use with a conventional barbecue consisting of a bowl-shaped body 10 supported on legs 12. The disposable liner of the invention comprises thin sheet 13 of aluminum foil formed by means of a die into a bowl-shape to fit and rest into the bowl-shaped body 10. The die which forms the bowl-shaped body will, simultaneously with forming the bowl, form the sheet with a plurality of annular raised ribs 14 concentric with center 15 of the body 12. Troughs or air passages 16 are formed between adjacent pairs of ribs. The center may be punched to provide a passage for the conventional adjustable support for a grill (not shown) placed across the body 12.

It is preferred to have the ribs sufficiently high to provide an air passage between adjacent ribs. The ribs should be spaced so that initially the briquettes which are used as fuel will straddle the channels 16.

Figure 2:
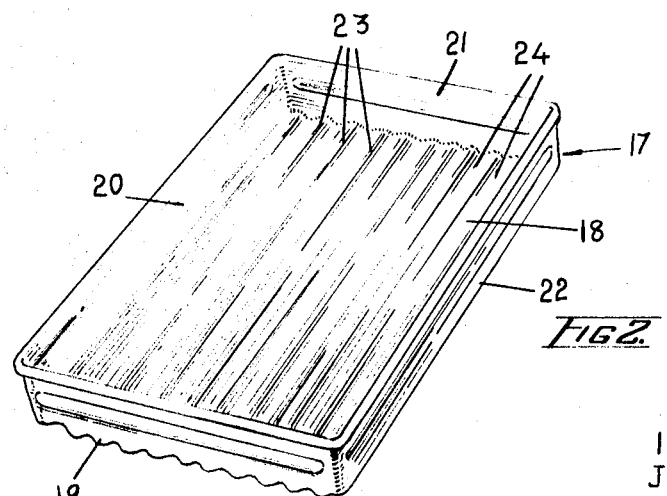
FIG. 2 shows a perspective view of a rectangular liner which is longitudinally ribbed.

FIG. 2 is a perspective view illustrating a modification in which the liner has the shape of a rectilinear container of relatively thin aluminum foil generally indicated by the number 17 defined by bottom 18 and sidewalls 19 to 22. The bottom 18 is formed with a plurality of parallel ridges 23 separated by troughs 24 having the same function as the ridges 14 and channels 16.

The aluminum foil should be of sufficient weight to retain its shape under normal conditions of use but can still be easily folded, at the end of the barbecuing, to wrap-up the ash and dead coals.

What I claim is:

1. A flexible fire resistant disposable liner for use in a portable barbecue having a fuel burning compartment, said liner comprising a sheet of aluminum foil having substantially parallel and circular ribs formed into a dish-shaped body to fit inside and substantially cover the interior of the fuel burning compartment, the said ribs being concentric with the geometric center of the dish-shaped body, and the ribs are uniformly spaced a distance less than the initial size of the fuel to thereby provide substantially unobstructed passages for the introduction of air to the fuel from below.